United States Patent
Gusler et al.

(10) Patent No.: US 7,748,621 B2
(45) Date of Patent: Jul. 6, 2010

(54) METHOD AND SYSTEM FOR DISSEMINATION OF PAPERLESS TRANSACTION RECEIPTS IN NON-NETWORKED ENVIRONMENTS

(75) Inventors: Carl Phillip Gusler, Austin, TX (US); Rick Allen Hamilton, II, Charlottesville, VA (US); Steven Jay Lipton, Flower Mound, TX (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 11/146,478

(22) Filed: Jun. 6, 2005

(65) Prior Publication Data

US 2006/0273163 A1 Dec. 7, 2006

(51) Int. Cl.
G06K 5/00 (2006.01)
G06K 7/01 (2006.01)
G06K 15/00 (2006.01)
G06K 19/06 (2006.01)

(52) U.S. Cl. .................. 235/383; 235/380; 235/382; 235/492; 235/382.5

(58) Field of Classification Search ............. 235/375, 235/383, 380, 376, 385, 492, 384, 382, 379; 705/1–2, 15–16, 44, 38–40, 14, 26, 30, 51; 707/103; 709/201; 53/438
See application file for complete search history.

(56) References Cited

U.S. PATENT DOCUMENTS

| 3,860,796 | A | * | 1/1975 | Wallace et al. | 235/493 |
|---|---|---|---|---|---|
| 5,278,396 | A | * | 1/1994 | McGaha | 235/383 |
| 5,590,038 | A |   | 12/1996 | Pitroda |   |
| 5,862,325 | A | * | 1/1999 | Reed et al. | 709/201 |
| 6,021,626 | A | * | 2/2000 | Goodman | 53/438 |
| 6,164,529 | A | * | 12/2000 | Peters et al. | 235/379 |
| 6,394,341 | B1 | * | 5/2002 | Makipaa et al. | 235/379 |
| 6,487,540 | B1 |   | 11/2002 | Smith et al. |   |
| 6,533,168 | B1 | * | 3/2003 | Ching | 235/375 |
| 6,582,304 | B2 |   | 6/2003 | Walker et al. |   |
| 6,587,835 | B1 | * | 7/2003 | Treyz et al. | 705/14 |
| 6,598,024 | B1 |   | 7/2003 | Walker et al. |   |
| 6,601,036 | B1 |   | 7/2003 | Walker et al. |   |
| 6,644,546 | B2 |   | 11/2003 | George et al. |   |
| 6,758,393 | B1 | * | 7/2004 | Luciano et al. | 235/379 |

(Continued)

FOREIGN PATENT DOCUMENTS

EP 1280 15 A 1/2003

(Continued)

*Primary Examiner*—Thien M. Le
*Assistant Examiner*—Thien T Mai
(74) *Attorney, Agent, or Firm*—Schmeiser, Olsen & Watts; William H. Steinberg (57) ABSTRACT

Electronic transaction receipts in remote non-networked sales equipment are sent through infrared or radio frequency means to portable electronic devices such as personal digital assistants (PDA's)/smart cellular telephones that are in the possession of the consumer. These portable devices are possessed by the consumer and are in very close proximity to the POS device transmitting the information. Security procedures also verify the receiving device to avoid inadvertent transmissions and to provide addition security for the transmission. The information and records received by these portable devices may be stored and uploaded into other electronic media at the discretion of the consumer.

20 Claims, 8 Drawing Sheets

U.S. PATENT DOCUMENTS

| | | | |
|---|---|---|---|
| 6,840,441 B2 * | 1/2005 | Monaghan et al. | 235/379 |
| 6,868,403 B1 * | 3/2005 | Wiser et al. | 705/51 |
| 6,873,715 B2 * | 3/2005 | Kuo et al. | 235/380 |
| 6,899,622 B2 * | 5/2005 | Lind et al. | 463/17 |
| 6,938,002 B2 * | 8/2005 | Moskowitz et al. | 705/26 |
| 7,069,240 B2 * | 6/2006 | Spero et al. | 705/30 |
| 7,461,010 B2 * | 12/2008 | Kwan | 705/26 |
| 2002/0133418 A1 * | 9/2002 | Hammond et al. | 705/26 |
| 2002/0156682 A1 * | 10/2002 | DiPietro | 705/16 |
| 2003/0001005 A1 * | 1/2003 | Risafi et al. | 235/380 |
| 2003/0033272 A1 * | 2/2003 | Himmel et al. | 707/1 |
| 2003/0055792 A1 | 3/2003 | Kinoshita et al. | |
| 2003/0121966 A1 | 7/2003 | George et al. | |
| 2003/0126020 A1 * | 7/2003 | Smith et al. | 705/16 |
| 2003/0197055 A1 | 10/2003 | Ben-Aissa | |
| 2003/0216983 A1 | 11/2003 | Bodin | |
| 2003/0221110 A1 | 11/2003 | Kryvoruchko et al. | |
| 2004/0054592 A1 * | 3/2004 | Hernblad | 705/15 |
| 2004/0117301 A1 * | 6/2004 | Fujisawa et al. | 705/39 |
| 2004/0220964 A1 * | 11/2004 | Shiftan et al. | 707/103 R |
| 2004/0243434 A1 * | 12/2004 | Peterka et al. | 705/2 |
| 2005/0114653 A1 * | 5/2005 | Sudia | 713/158 |
| 2005/0165684 A1 * | 7/2005 | Jensen et al. | 705/44 |
| 2006/0151598 A1 * | 7/2006 | Chen et al. | 235/379 |

FOREIGN PATENT DOCUMENTS

| | | |
|---|---|---|
| JP | 09161152 A2 | 6/1947 |
| JP | 11053650 A2 | 2/1999 |
| JP | 11134141 A * | 5/1999 |
| JP | 2003196744 A2 | 12/2001 |
| JP | 2002298222 A2 | 10/2002 |
| JP | 2002312853 A2 | 10/2002 |
| JP | 2003077064 A2 | 3/2003 |

* cited by examiner

- Date
- Time
- Customer Name
- Transaction Amount
- Vendor Name
- Location
- Credit Card Type (Visa, Discover, etc)
- Portion of Credit Card Number

FIG. 6c

- Date
- Time
- Transaction Amount
- Vendor Name
- Location
- Credit Card Type (Visa, Discover, etc)
- Full Credit Card Number

METHOD AND SYSTEM FOR DISSEMINATION OF PAPERLESS TRANSACTION RECEIPTS IN NON-NETWORKED ENVIRONMENTS

FIELD OF THE INVENTION

This invention relates to a method and system for distributing a paperless receipt to a purchaser following a commercial transaction and in particular to a method and system of distributing paperless receipts, providing a traceable record of a commercial transaction that occurs in diverse non-networked or remote environments.

BACKGROUND OF THE INVENTION

Electronic transactions involving the transfer of money and pecuniary assets are common in our society today. Goods and services are also commonly purchased over the telephone or via the Internet using credit or debit accounts with electronic authorization. Retail vendors typically accept credit and debit cards, which are verified and authorized using electronic communications methods. Nearly every significant retail vendor accepts some form of credit or debit card as remuneration for goods or services. Transactions involving a credit or debit card account require authorization from the organization that issues the card. This authorization is generally obtained at the point-of-sale by a vendor through electronic communications channels. A transaction amount is determined and the amount of the transaction along with the account identification information is transmitted to the organization, which issued the card or an authorization provider. After internal approval, the card issuer will send an authorization code to the vendor or authorization provider, which indicates that the issuer will transfer the authorized amount to the vendor at an appropriate time.

These point-of-sale authorization request devices are typically connected to the card issuers or their representatives, sometimes known as authorization processors (APs), through a conventional telephone line. Often a dedicated phone line is connected to the point-of-sale authorization device for quick access to authorization data.

Wireless communication technology has progressed rapidly in recent years. Cell phones and other long-range communication devices have proliferated and are now commonplace among consumers. As technology advances, the cost of these devices is plummeting and even more widespread use is eminent. Mobile phones, pagers, two-way radios, smart phones, personal digital assistants (PDAs) and other communicators are all available on the market. Internet use is also skyrocketing with millions of new users logging on each year. Internet commerce now represents a significant portion of retail commerce and is used by millions of consumers each day.

Communications protocols exist which allow present generation electronic communications devices to interface with the Internet and access Internet resources. The Wireless Application Protocol (WAP) is an open, global specification that enables mobile wireless communications devices to access and interact with Internet information and services. WAP is a communications protocol and environment which can be built on nearly any operating system including PalmOS, EPOC, Windows CE, FLEXOS, OS/9, JavaOS and others and provides service interoperability between different device families. WAP works with most existing wireless communications networks. WAP developers operate Internet gateways specifically tailored for wireless communications device users.

By using WAP and similar technologies, vendors, news agencies, financial institutions and other providers allow cell phone and other portable communications device users to buy and sell securities, execute credit card transactions, make account transfers, make bill payments, receive and send e-mail, view news reports. These providers offer seamless integration between the Internet and wireless portable communication devices.

Wireless communication devices are also becoming commonplace in the electronics industry. Wireless networking of portable computers and associated devices is now replacing a large segment of the networking market. Another innovation in the wireless communications arena is the advent of short-range wireless networking between portable communications devices. One standard for this technology is known as Bluetooth®, and is being established by a collaborative group of communications and computing companies. Devices incorporating Bluetooth® technology will utilize a microchip transceiver for communications between devices. Bluetooth® devices will transmit in the previously unused 2.4 GHz range and will have a range of about 10 meters which may be extended to about 100 meters by increasing transmitter power. Bluetooth® technology promises to be a viable and economical networking solution for interconnection of cell phones, computers, printers, modems, computer peripherals, fax machines and other communications and computing devices. The size of the Bluetooth® transceiver makes it usable in devices as small as palm computers and cell phones.

Another established wireless connectivity standard is known as IrDA and employs infrared radiation to communicate between devices. IrDA is a point-to-point narrow angle, ad-hoc data transmission standard designed to operate over a distance of 0 to 1 meter at speeds of 9600 bps to 16 Mbps. It is typically used in a point-and-shoot fashion by pointing one device at another for direct data transmission.

As mentioned, personal purchasing transactions today occur under numerous unique circumstances, but several facts may be stated without contention. First, electronic payment options, including credit and debit cards have gained in popularity in recent years due to the convenience they offer. Secondly, the rise of unmanned and electronically capable Point-of-Sale (POS) machines in a great variety of locations including, airports, gas stations, travel rest stops, and elsewhere has similarly increased the demand for electronic payment. However, these electronic payment forms are encumbered by a legacy brought forth by older forms of transactions: paper receipts. While computer based purchases may be consummated with an email "receipt," signifying the particulars of the transaction, such "in person" sales are still subject to the paper trail, where the purchaser is forced to maintain an awkward variety of papers acting as proof of completed transactions. Please note further that email receipts are less psychologically desirable for transactions, due to (a) the lack of pervasive email access while a person is conducting a remote POS transaction; (b) the delays which may accompany traditional email transactions, resulting in potential multi-minute gaps between the completion of a transaction and the acceptance of a receipt, and (c) the reluctance of users to widely share their email address due to concerns with being deluged with email "spam". Thus, emailed receipts for remote transactions mean that the purchaser will still normally walk away with no verifiable proof or documentation of transactions that just transpired.

While electronic receipts exist in current art, they are almost entirely for the sole or joint benefit of the business, where the present art is primarily of benefit to the consumer. Consider a traveling business user who is required to account for all expenditures. This user may stop at several remote gasoline stations and vending areas while enroot between locations. Presently, most unmanned remote machines do not provide any type of receipt, and as such, the user is forced to manually document each transaction, and must later manually transfer that data to an expense accounting system. Now consider a business person who travels on a regular basis, and must repeat this process over and over again. The present art would be of great convenience to the consumer, and would provide competitive advantage to vendors employing such methods. Consider again the traveling business person who stops at a vending area where some machines are electronic receipt enabled, and some are not. It is clear that the majority of users would decide to patronize the receipt enabled machines.

There have been attempts to address this use of a paper to receipt to provide proof of a transaction. U.S. Pat. No. 6,487,540 provides systems, methods and apparatus for the generation, transmission, storage and manipulation of electronic receipts, which communicate, itemized purchase transaction information. In this system, wireless vendor devices and wireless purchaser devices which transmit electronic receipts at a point-of-sale for documentation of a purchase transaction. Further processing of the electronic receipt information may be performed with a purchaser device or with a secondary computing device after subsequent receipt transmission to that secondary device. However, this system does not provide protection against inadvertent transmissions nor does it provide confirmation to the user and vendor of the completion and accuracy of the transaction.

There remains a need for a method and system that eliminates the need for a paper receipt following a commercial transaction. This system can provide the receipt via a mechanism, which provides immediate feedback for the user, allowing both seller and purchaser to comfortably know that all transactions have been completed with full delivery and payment verification.

SUMMARY OF THE INVENTION

It is an objective of the present invention to provide a method and system that produces an immediate electronic receipt to a consumer in a non-network environment It is a second of the present invention to provide a method and system that will produce an electronic receipt at the completion of a commercial transaction between the consumer and vendor parties at the location of the transaction.

It is a third objective of the present invention to provide a method and system that will transmit an electronic receipt of the commercial transaction from the vendor to the consumer at the remote location of the transaction.

It is a fourth objective of the present invention to provide system that comprises a portable electronic device in possession of the consumer that will receive information of the transaction transmitted by the vendor device.

It is a fifth objective of the present invention to provide a method that will verify the identity of a consumer before transmitting transaction information to that consumer that is the party to the commercial transaction.

It is a sixth objective of the present invention to provide a method that can encrypt information transmitted by the vendor device to the consumer device to ensure protection and mutual validation of the transaction information.

In the present invention, electronic transaction receipts in remote non-networked sales equipment are sent through infrared or radio frequency means to portable electronic devices such as personal digital assistants (PDA's)/smart cellular telephones that are in the possession of the consumer. The information and records received by these portable devices may be stored and uploaded into other electronic media at the discretion of the consumer. The requirements to accomplish this are firstly, seller POS equipment capable to transmitting the receipt electronically, and secondly, purchaser POS equipment capable of receiving the receipt electronically. Furthermore, this invention takes advantage of the increasing popularity of PDA's and other such infrared-ready, Bluetooth-enabled, and wireless-ready devices, recognizing them as enabling the second requirement already.

Given the concepts laid out here, rather than a wallet or purse stuffed with paper receipts from remote transactions, the user would instead accumulate receipts through wireless means, to be stored in a portable electronic device. Furthermore, such electronic storage permit receipts to then be uploaded into personal financial software, e.g., Quicken or MS Money, at the purchaser's convenience. Furthermore, such electronic storage permits receipts to be uploaded to merchant web-sites and credit card and bank web-sites to validate or challenge transactions.

Furthermore, in an option contributing to the concept's attractiveness, it is envisioned that such receipts would be uploadable into merchant and bank we-sites via conventional web-browser software. Such compatibility may either be designed into the data structure of the receipt itself. In a more likely scenario, transaction software would be provided to assist with this process by the web-site (such as through a Java applet).

Advantages gained by this art include material and labor cost savings as compared to generation of paper receipts, and convenience for both the purchaser and vendor.

DETAILED DESCRIPTION OF THE INVENTION

In the detailed descriptions, which follow, the Point-of-Sale (POS) point will be described as a "kiosk". Now that this is a broad definition, and could encompass traditionally-staffed cash registers, credit card driven unmanned POS machines such as gasoline pumps, or other electronic purchases POS's such as vending machines, telephones, and other such devices.

Figure 1:
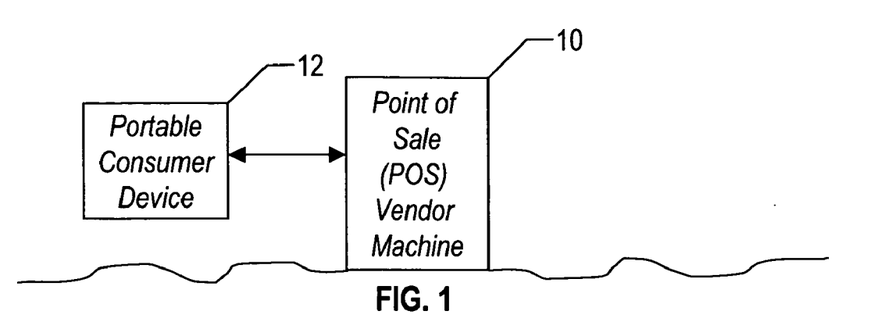
FIG. 1 illustrates a configuration of the system of the present invention showing a communication and transmission between Point-of-Sale (POS) vendor device and a consumer portable electronic device.

Referring to FIG. 1, shown is the basic configuration for transmission of an electronic receipt to the consumer. The consumer completes a transaction at the POS terminal 10. The consumer then presents a portable electronic device (PED) 12, such as PDA or cellular telephone that can receive an electronically transmitted receipt from the POS terminal 10. In order for the transmission of an electronic receipt from the POS terminal to the PED, these devices will be in close proximity to each other. Preferably the devices are only a matter of inches apart.

Figure 2:
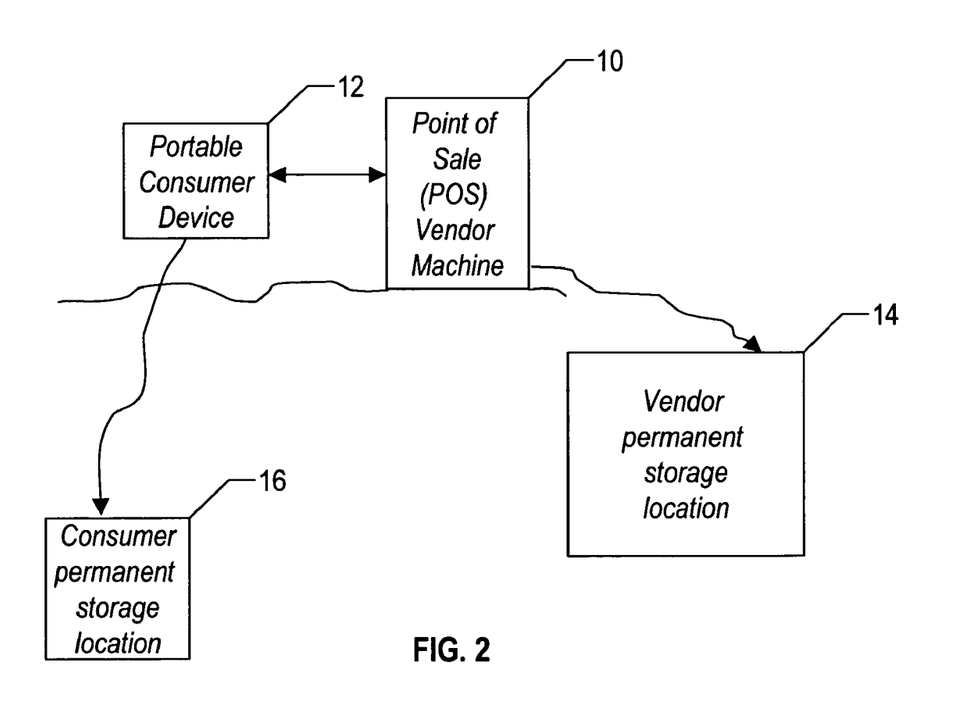
FIG. 2 illustrates a configuration of the system of the present invention showing a POS vendor device, a vendor storage location connected to the POS, a consumer portable electronic device and a permanent storage location for storing consumer information.

The POS terminal and the PED may only serve temporary storage locations for the information of the completed transaction. Therefore, at some point, this transaction information will be downloaded to permanent storage locations for both devices. FIG. 2 illustrates a configuration that can facilitate these downloads. In this configuration, each device will perform a separate download to its own permanent location. The POS terminal 10 will download to permanent storage facility 14 and the PED 12 will download to storage facility 16. As shown in FIG. 2, each device can perform a point-to-point download of the transmission information.

Figure 3:
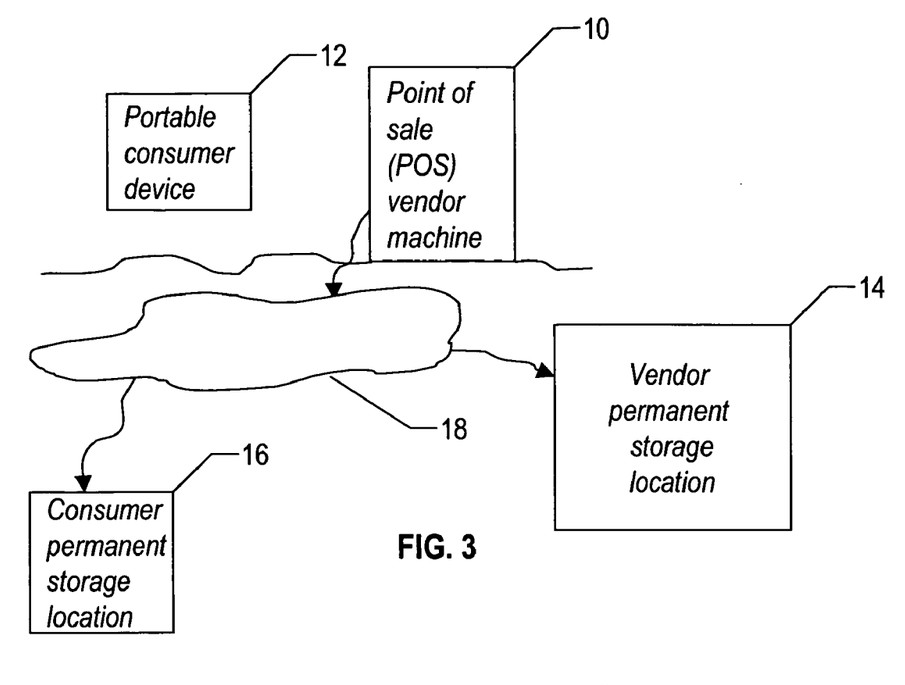
FIG. 3 illustrates a configuration of the system of the present invention showing a POS vendor device in communication and transmission with the consumer portable electronic device and the POS vendor device connected to the vendor storage location and connected to a permanent consumer storage device via a global computing network.

FIG. 3 illustrates an alternate configuration of the system for purposes of downloading transaction information to permanent storage locations. In this configuration, the POS terminal 10 is in communication and transmission with the consumer PED 12. The POS terminal is connected to the vendor storage location 14 and is also connected to a permanent consumer storage location 16 via a global computing network 18. With this configuration, the consumer can receive the electronic receipt at the PED, but also automatically receives the receipt at their permanent storage location. This approach gives the consumer an additional receipt confirmation of the transaction. At the present time, consumers can receive email electronic receipts for their transactions at their home or office computers. These receipts are generated and transmitted by the merchant that was the other party to the transaction.

Figure 4:
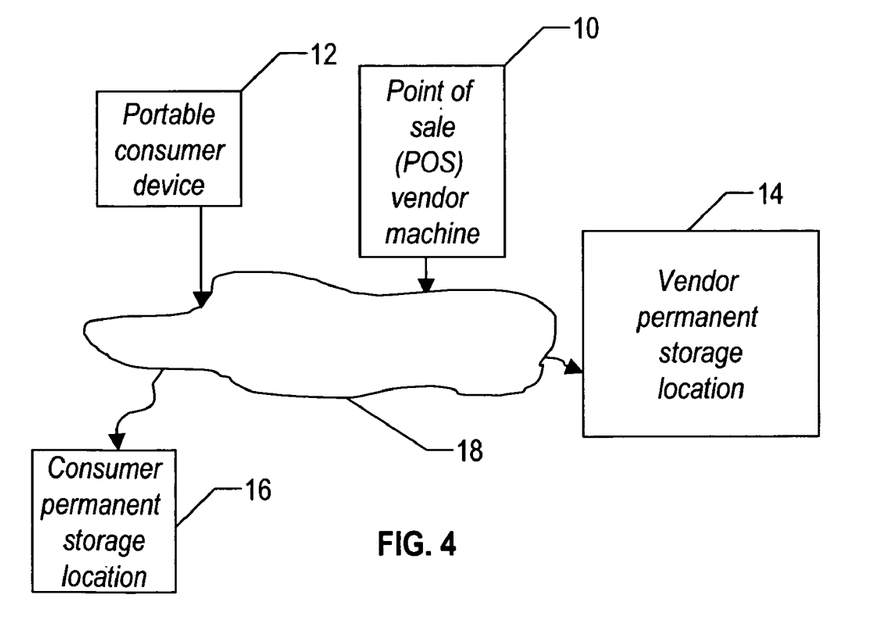
FIG. 4 illustrates a configuration of the system of the present invention showing a POS vendor device connected to the vendor storage location via a computing network and a consumer portable electronic device connected to a permanent consumer storage device via a global computing network.

FIG. 4 illustrates a configuration of the system of the present invention showing both the POS terminal device 10 and the consumer PED 12 transmitting transaction information to permanent storage locations (14, 16) via a global computing network 17. This configuration is similar in its objective to FIG. 2. In an application of this configuration, the consumer could receive an electronic receipt at the PED and confirm the accuracy of the receipt. The consumer could then download the receipt information via email to an account of the consumer. This feature may be desirable if the POS device does not perform downloads to a location specified by the consumer.

Figure 5:
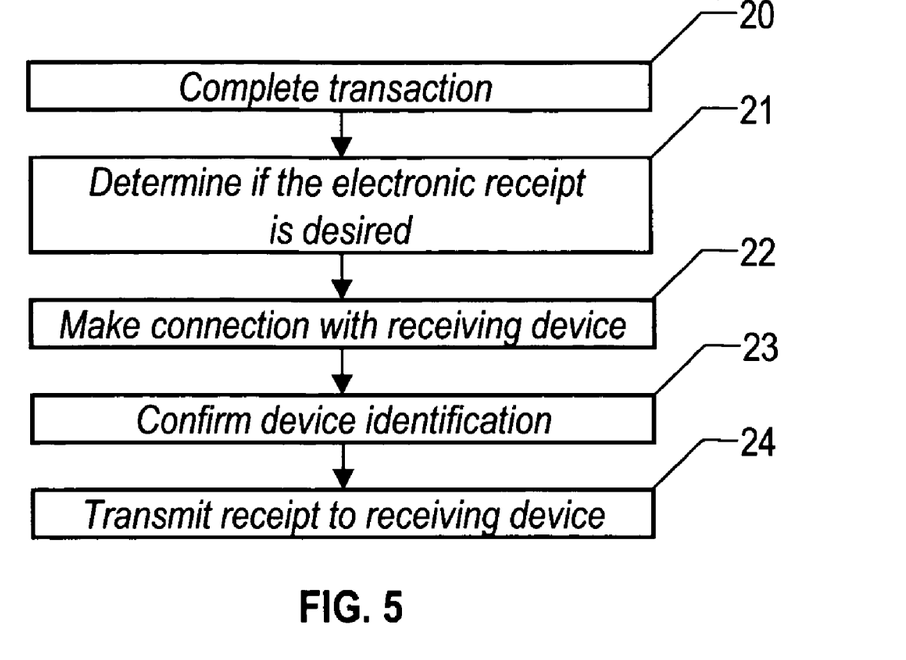
FIG. 5 illustrates the basic steps in the implementation of the method of the present invention.

With regard to the method of the present invention, FIG. 5 illustrates the basic steps in the implementation of the method of the present invention. In step 20, a total purchase amount is determined at an enabled POS point. Once the purchase learns of price, the purchaser presents a method of payment. Again, this boundary condition behavior follows legacy designs, as no new technologies are introduced at this point. However, at this point, step 21 determines whether the consumer wants to receive an electronic receipt. Step 21 has several options for its implementation. In one optional implementation, the consumer is queried and asked whether he or she would like an electronic receipt in lieu of paper receipt. The query can be either verbally from the POS terminal, through generated visual queues (such) as computer display screen, or through audio queues (such as synthesized voice). A time-out period at this point is conceivable, wherein a user has some period of time, e.g., five seconds, to agree to the electronic receipt or to a paper receipt. The default (after the time period has expired with no response from the consumer) response could be either printing a paper receipt or transmitting an electronic receipt, depending on the concept's market penetration, geographic position (e.g., rural versus urban settings), and other such demographic considerations.

In another optional implementation of step 21, the POS kiosk would, upon receipt of the payment method, automatically begin scanning for a receiving device. As implied above, this exchange could either be radio frequency, which has benefits of being line-of-sight independent, or it could be infrared. Given this option, a user might simply hold up his/her collection device (PDA/cellular telephone), and an automated search and handshake operation could commence without explicit queues from the POS kiosk. The automatic scanning by the POS could involve sending out a signal and detecting whether that signal had been received by a portable electronic device in close proximity to the POS device. This transmitted signal could be a query or queue such that an electronic device receiving the signal would be queue to transmit an acknowledgment of the receipt of that signal. Once the POS device receives that receipt, the POS device knows that an electronic device is in the area and the step of establishing a formal communication connection begins.

Still in a third embodiment of step 21, a vendors "smart card" could serve as both the payment method and the receipt collection mechanism. As an example, an Exxon/Mobile smart pass could be enhanced such that it is not only automatically applies the selected payment method to a transaction, but it automatically collects receipt data upon close of the transactions, such data then being available for download into other computing devices.

If the consumer agrees to an electronic receipt, the process moves to step 22. Depending on which of the above options of step 21 was followed, the mechanism for an electronic receipt might be depression of a physical or logical button on the kiosk, or it may simply be a default setting for a given environment. Furthermore, the agreement could simply entail the consumer presenting a detectable electronic receiving device before the POS.

Step 22 establishes the connection and initial handshake between POS terminal 10 and consumer PED 12. The handshake can consists of query originating from vendor device (POS) with confirmation returned by customer device. The outcome of this is process is the confirmation by the POS device that such a ready collection device is available to receive an impending transmission.

Step 23 is an optional step that confirms the PED device as being possessed by the consumer. This step is to further secure the transmission of the information. This step is designed to minimize chances of inadvertent data transmissions. In this step, the POS kiosk, could display user information, such as purchaser name, and await confirmation from the user. Specifically, the initial handshake could have resulted in the consumer/purchaser's name being displayed on the POS kiosk. In this optional step, the consumer would then either depress a physical or logical button on the POS kiosk to confirm acceptance, or could indicate acceptance on the collection device itself. The value in this optional step is the mitigation of intercepted receipts. The risk of not conducting this step is that another collection device may theoretically be in the area and may inadvertently collect the electronic receipt. While it is recognized that this risk is low, and could be further mitigated by careful selection of engineering design parameters (strength and dispersion of POS kiosk signals), this additional step lowers that possibility to nearly zero.

Figure 5A:
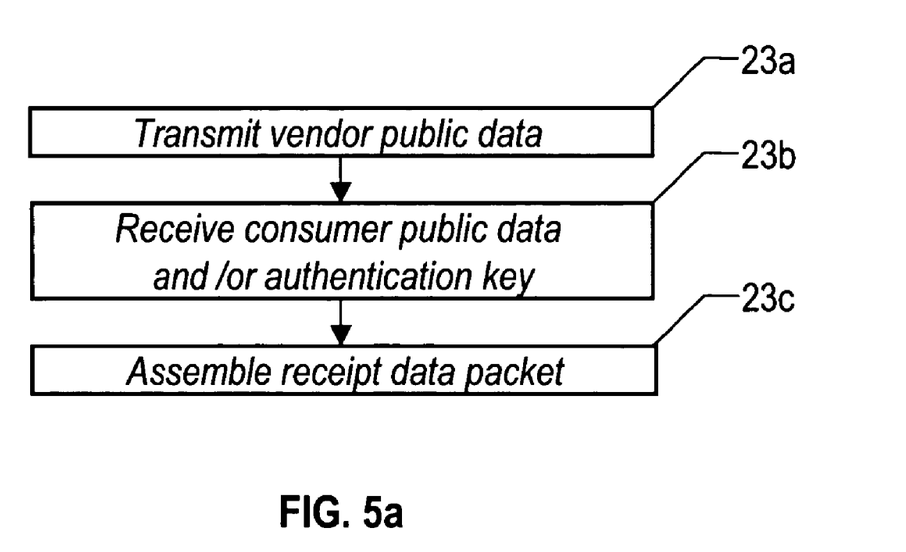
FIG. 5*a* illustrates the steps in the device confirmation step of FIG. 5.

FIG. 5a further illustrates the steps involved in the implementation of step 23. In Steps 23a through 23c, the consumer PED and the vendor POS terminal cooperate in order to assemble a final receipt data packet (such as shown in FIG. 6.) These two devices may perform hand-shaking and validation in preparation for each device providing it's own delegated portions of the final data packet. Or, these two devices may provide encryption or authentication keys in order for one of the devices to assemble the final packet and share it with the other. In the most likely embodiment, which is described here, the consumer PED would provide authentication keys, and the vendor POS terminal would assemble the final data packet.

In this method, step 23a transmits the basic transaction information to the consumer PED from the vendor POS terminal. In this transmission, the vendor device, i.e. POS kiosk, transmits a preliminary data packet containing at least the date and time of the transaction, the transaction amount, and selected other information. In Step 23b, the vendor POS receives data from the consumer PED in order to complete the consumer portion of the data packet. In one embodiment, the vendor POS receives an authentication or encryption key from the consumer PED in order to complete the consumer portion of the data packet. In another embodiment, the vendor POS receives the completed encrypted consumer portion of the final data packet. In Step 23c, the vendor POS assembles the final data packet embodying the electronic receipt.

Referring back to step 24 transmits the final transaction information to the consumer PED from the vendor POS terminal. In this transmission, the vendor device, i.e., POS kiosk, transmits a data packet containing at least the date and time of transaction, the transaction amount, and vendor identification.

Figure 6A:
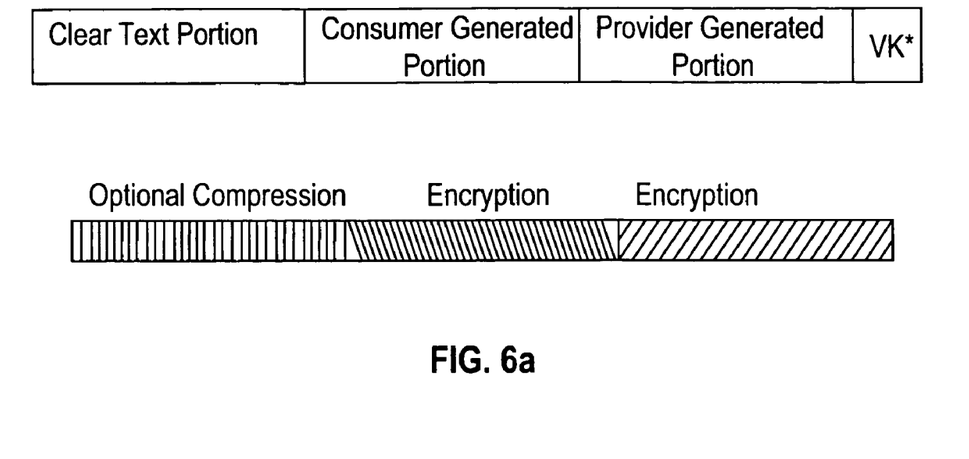
FIG. 6*a* illustrates a data record format that can contain sales transaction information.

FIG. 6a illustrates a data record format that can contain sales transaction information. Optionally, the vendor device may also send a unique transaction identifier, which may be wholly derived by the vendor, or which may be in part derived through a credit card/debt card authentication identifier. This transmission may occur either (a) unilaterally and in whole, such that the data will be sent without further inputs or response required from the customer device. The transmission could be sent (b) bilaterally and in whole, in which all fields as defined above are sent, and then a response/confirmation is expected from the customer device. Lastly, it could occur (c) bilaterally and in tandem, such that a field or subfield is transmitted, a response/confirmation is expected and upon confirmation, the next component will be sent, etcetera.

In the scenario of bilateral transmissions between the POS kiosk and the consumer's PDA, the data packets exchanged may contain encrypted verification information, enabling the merchant and the consumer to satisfy him or herself that there can be provided by the POS kiosk, the consumer's PDA, or both.

FIG. 6A illustrates the general contents of the completed receipt data packet. This packet has several portions that contain transaction data. The clear text or common data portion of the data packet includes key information about the transaction that is important to both the consumer and the vendor or provider. This common information is encoded in clear format readable to all parties. The most likely embodiment would be clear text. This common portion might be optionally compressed using a simple lossless digital data compression technique, in order to save space for data storage and transmission. The consumer-generated portion of the data packet includes information about the transaction that is important to the consumer. That data is digitally encrypted using encryption keys or codes provided by the consumer. The provider generated portion of the data packet includes information about the transaction that is important to the vendor or provider. This data is digitally encrypted using encryption keys or codes provided by the vendor. The final or 'VK' portion of the data packet is a digital validation key, which would be used to detect whether any of the data bits in the data packet have been changed. The digital bits making up the validation key might be distributed throughout the complete data packet.

Figure 6B:
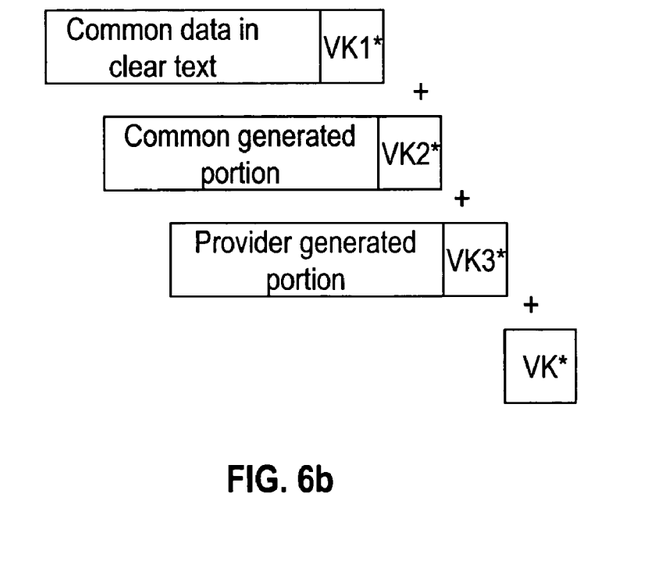
FIGS. 6*b* through 6*e* illustrate details of the data record format.

FIG. 6B illustrates in more detail the relationship between the main portions of the data packet that make up the digital paperless receipt. Each of the three major components described above might have their own individual validation keys (VK) to validate that the data in each individual portion has not been changed.

Figure 6C:
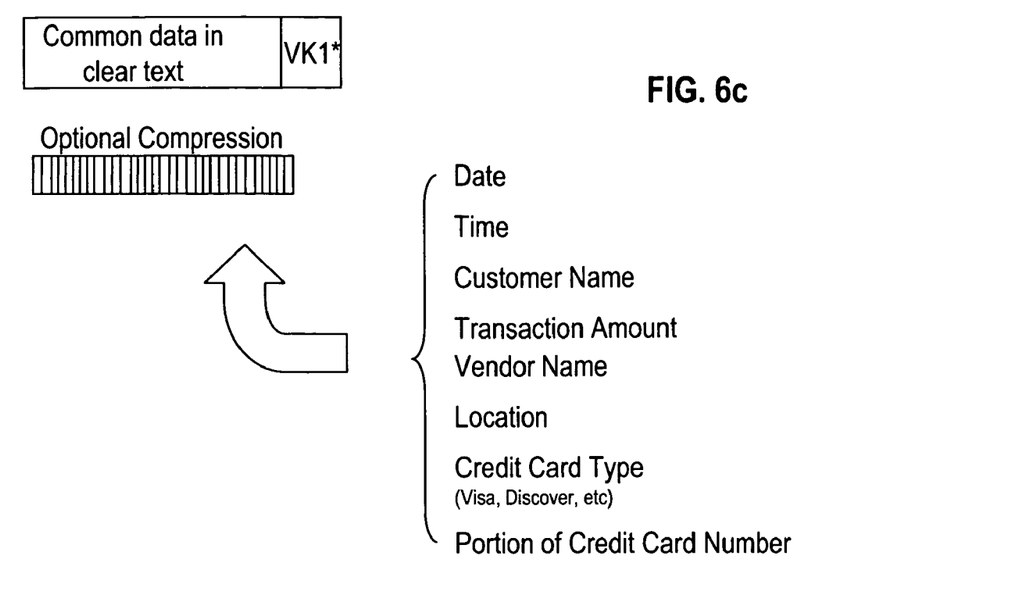

FIG. 6C illustrates the contents of the common data portion of the final data packet. This data would be encoded in some clear format readable by all parties. This format would most likely be digitally encoded text. A special key would be included to validate that the data had not been changed. This key might be similar to the commonly used cyclic redundancy checksum (CRC) or more robust validation keys available today. The common data would include all the things typically printed on a conventional paper receipt.

Figure 6D:
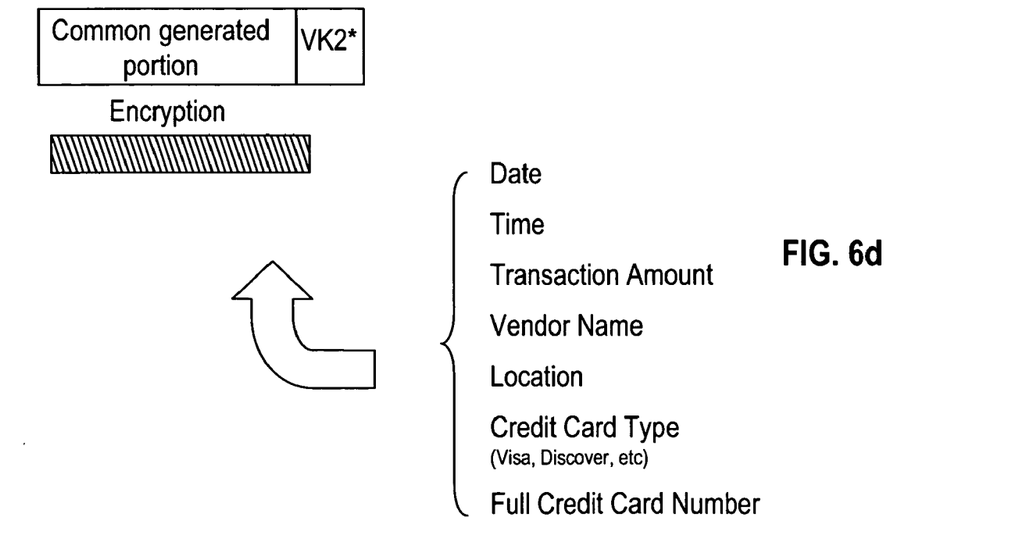

FIG. 6D illustrates the contents of the consumer generated data portion of the final data packet. This data would be encrypted for the sole use of the purchaser, so that the consumer can satisfy himself or herself that the information about the transaction has been accurately recorded. A special key would be included to validate that the data had not been changed. This key might be similar to the commonly used cyclic redundancy checksum (CRC) or more robust validation keys available today. The consumer data would include the key things typically printed on a conventional paper receipt.

Figure 6E:
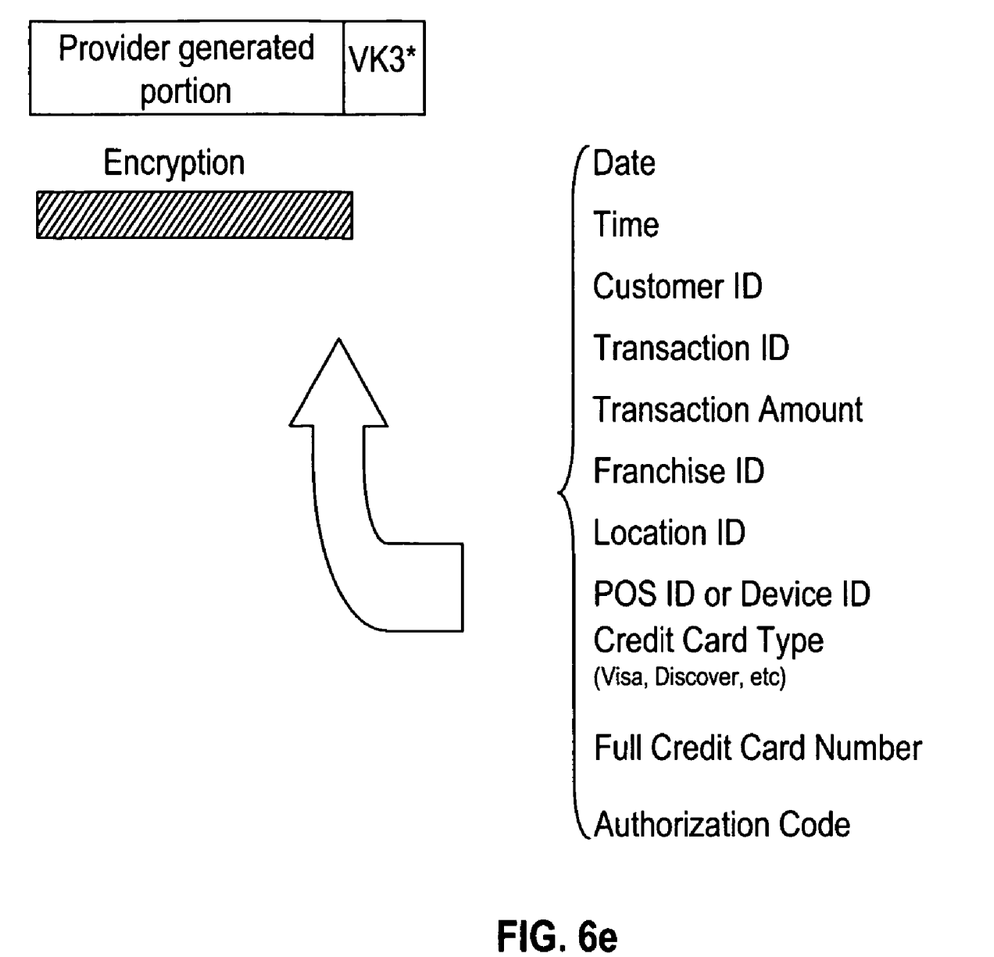

FIG. 6E illustrates the contents of the vendor or service provider data portion of the final data packet. This data would be encrypted for the sole use of the provider, so that the provider can be satisfied that the information about the transaction has been accurately recorded. A special key would be included to validate that the data had not been changed. This key might be similar to the commonly used cyclic redundancy checksum (CRC) or more robust validation keys available today. The provider data would include the key things typically recorded by a vendor at the time of a transaction. The validation keys in FIGS. 6A through 6E can be used by either party to validate that no details of the transaction have been altered by error or evil intent.

Additionally, upon completion of the transaction, both the transmitting and receiving devices may optionally offer visual or audible confirmations that the transaction has been recorded. Such confirmations might include a blink of a light or audible tone to indicate that a receipt has been delivered, or actual presentation of the receipt particulars, in part or in whole, upon the customer's device. This step can further add to the security of the transaction. At this point, the consumer would now be able to see the particulars of the transaction just completed on his/her PDA or cellular telephone.

Furthermore, in an option not explicitly contributing to the novelty, but rather to the concept's attractiveness, it is envisioned that such receipts would be loadable into (i.e., comply with previously developed formats) personal finance software. Such compatibility may either be designed into the data structure of the receipt itself, or in a more likely scenario, translation software would be provided to assist with this process, such that the architecture of the data packets would not be constrained by existing design points for finance software.

Figures 7, 7A:
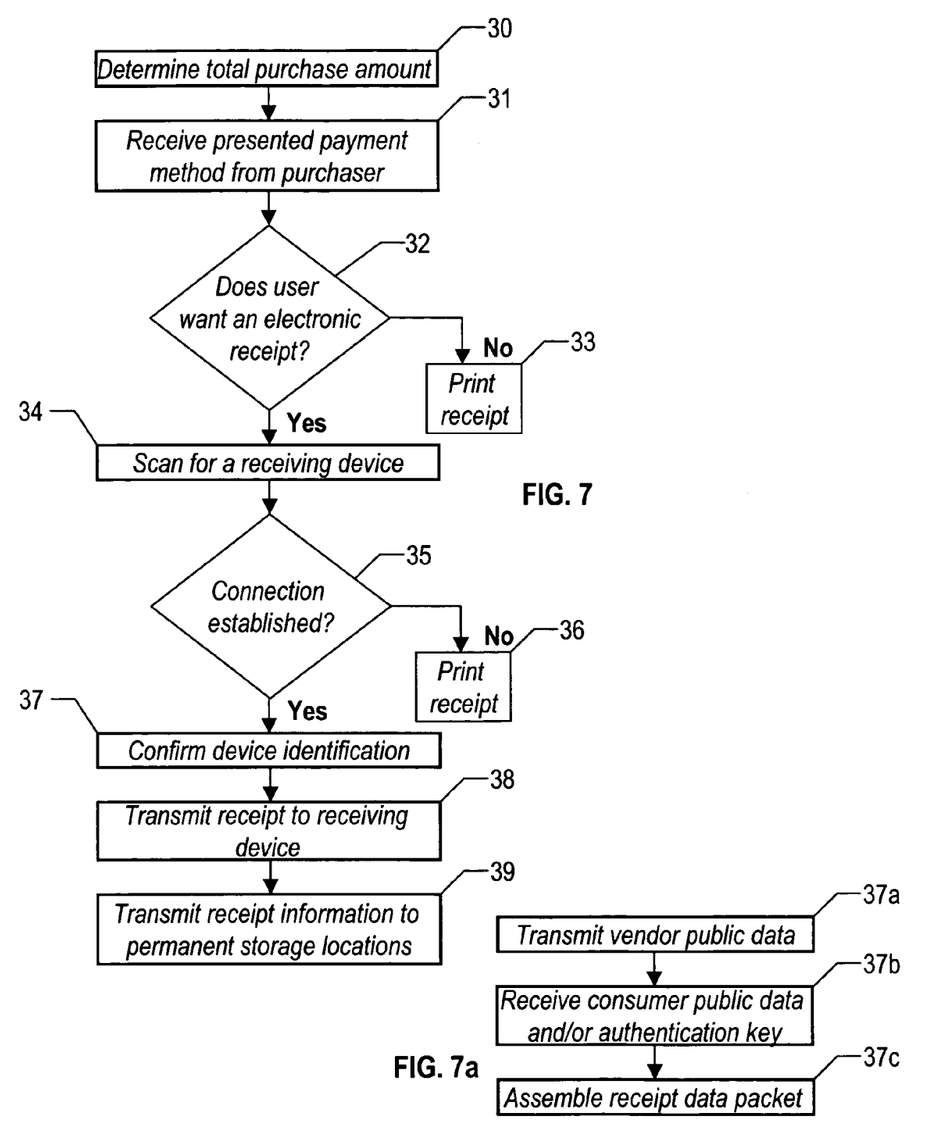
FIG. 7 is a more detailed version of the steps in the implementation of the present invention.
FIG. 7*a* illustrates the steps in the device confirmation step of FIG. 5.
Figure 8:
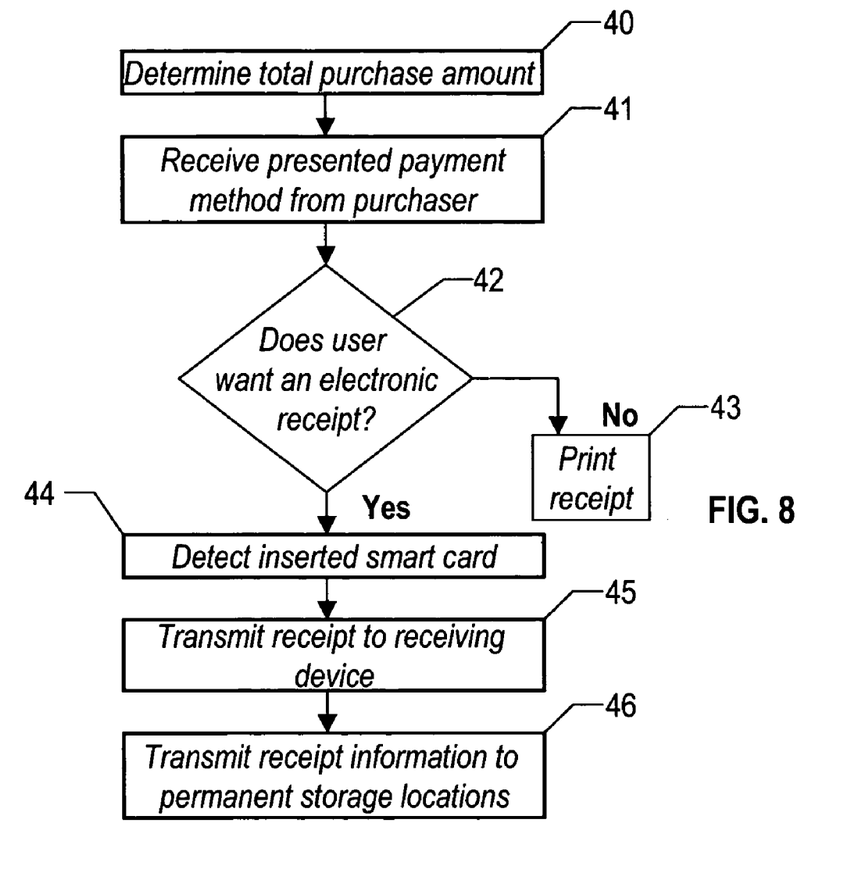
FIG. 8 is an alternate version of the steps in the implementation of the present invention containing device verification and confirmation information.

FIGS. 7 and 8 provide more detailed embodiments of the steps in the implementation of the present invention. In FIG. 7, step 30 determines the purchase amount for the goods or services that are part of the transaction. At this point, the POS terminal can request payment from the consumer. With conventional approaches, this request could be a screen display requesting payment type (cash, credit or debit). In step 31, the POS terminal would receive the indicated payment amount and provide change for cash or debit payment transactions. At the completion of payment, step 32 determines whether the consumer desires to receive an electronic receipt for the completed transaction. If the consumer preferred a paper receipt and indicated as such, step 33 would print a paper receipt for the consumer. In the event the consumer failed to respond, as previously mentioned as default condition would occur. The default response could be to print a paper receipt or to scan for an electronic device. This option will depend on the desires of the system providers. In step 32, another option for the consumer would be a no receipt option.

One option for providing a response to the electronic receipt query is for the consumer to indicate his/her desire for an electronic receipt by pressing a "Yes" button on the POS terminal. Once the POS receives the "Yes" response, in step 34, the POS would begin to scan for the consumer's electronic receiving device. This scanning step would not be needed in the case of a SMART CARD inserted into the POS terminal. In conjunction with this scanning operation, the POS would also attempt to connect with the consumer PED in step 35. This scanning process could also be for a defined time period, such as ten seconds. If no connection were established in step 35, a default response would again be to print a paper receipt for the consumer in step 36. For security reasons, it is undesirable to conduct for extended periods of time. If the connection between the POS terminal and the consumer PED is established, step 37 confirms/verifies the PED identity for security purposes.

As with FIG. 5, step 37 is further implemented by steps 37a, 37b and 37c shown in FIG. 7a. Step 37a transmits the basic transaction information to the consumer PED from the vendor POS terminal. In Step 37b, the vendor POS receives data from the consumer PED in order to complete the consumer portion of the data packet. In Step 37c, the vendor POS assembles the final data packet embodying the electronic receipt.

After this confirmation, steps 37a through 37c, the consumer PED and the vendor POS terminal cooperate in order to assemble a final receipt data packet (shown in FIG. 6.) These two devices may perform hand-shaking and validation in preparation for each device providing it's own delegated portions of the final data packet. Or, these two devices may provide encryption or authentication keys in order for one of the devices to assemble the final packet and share it with the other. In the most likely embodiment, which is described here, the consumer PED would provide authentication keys, and the vendor POS terminal would assemble the final data packet.

Finally, step 38 transmits the electronic receipt to the consumer PED. In step 39, the POS could also transmit the transaction information to an e-mail location of the consumer. This step may be desirable in a situation where the consumer has an account with the POS vendor. In this case, the vendor would probably already have the email information for the consumer.

FIG. 8 illustrates alternate method of the present invention. In FIG. 8, steps 40, 41, 42, and 43 correspond respectively in function to steps 30, 31, 32, and 33 of FIG. 7. If the consumer used a smart card, the device confirmation steps could be eliminated. Receipt information could be stored on the smart card. In this method, step 44 would detect the inserted smart card.

Figure 8A:
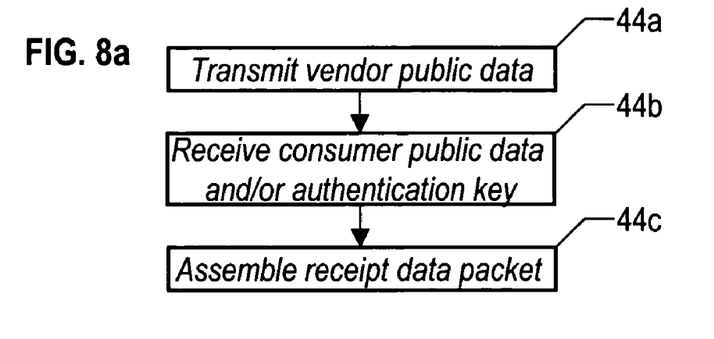
FIG. 8*a* illustrates the steps in the device confirmation step of FIG. 5.

In Steps 44a through 44c, the consumer PED and the vendor POS terminal cooperate in order to assemble a final receipt data packet (shown in FIG. 6.) These two devices may perform hand-shaking and validation in preparation for each device providing it's own delegated portions of the final data packet. Or, these two devices may provide encryption or authentication keys in order for one of the devices to assemble the final packet and share it with the other. In the most likely embodiment, which is described here, the consumer PED would provide authentication keys, and the vendor POS terminal would assemble the final data packet.

As with FIGS. 5 and 7, step 44a transmits the basic transaction information to the consumer PED from the vendor POS terminal. In this transmission, the vendor device, i.e. PO kiosk, transmits a preliminary data packet containing at least the date and time of the transaction, the transaction amount, and selected other information.

In Step 44b, the vendor POS receives data from the consumer PED in order to complete the consumer portion of the data packet. In one embodiment, the vendor POS receives authentication or encryption key from the consumer PED in order to complete the consumer portion of the data packet. In another embodiment, the vendor POS receives the completed encrypted consumer portion of the final data packet. In Step 44c, the vendor POS assembles the final data packet embodying the electronic receipt.

Step 46 would transfer the information to the smart card device. As with step 39, in step 47, the POS could also transmit the transaction information to an e-mail location of the consumer.

Use of the technology as described herein has presented options for Point-of-Sale kiosks to move beyond legacy receipts. By incorporation of the details here, the person armed with modern Personal Digital Assistants or (recognizing the slow but inevitable convergence of such devices) high function cellular telephones, may capture all transaction records in a far more advantageous and convenient means than those that are available today.

One question, which may be raised, is how the art discussed here deviates from the email receipt well known to anyone who orders on the web. Firstly, it may be observed that email receipts are pervasive for on-line ordering, not for POS transactions. Secondly, and more critically, the email receipt does not generally provide a form of immediate feedback to the mobile customer. By this, one may consider the fact that an emailed receipt would nominally be waiting for the purchaser upon return to his/her home, upon a check of the computer. Furthermore, even if a user has email routed to a pervasive device, network delays and aggregated deliveries may result in unacceptable time-lines for the POS transaction. As an example, a normal email sent from one organization to another may routinely experience a three-minute delay between the "send" action on one side and the "receive" action on the other. This is acceptable for asynchronous business and personal communications. However, the implication in the POS arena is that of a customer who expects to see a standard TCPIP-transmitted receipt appear in his or her cellular telephone in-box having to wait for three minutes at the pump, unsure of when or if the receipt will arrive. Additionally, if the user is in a "dead zone" or uncovered area, the pervasive device will never receive the receipt message forwarded by email while waiting at the service location and thus cannot confirm proper processing. Therefore, the user is again placing a great degree of trust in the purchaser and has no immediate feedback mechanism if email is the mechanism used. Finally, email transactions presuppose expensive communications subsystems and access to a local TCP/IP network. The present art is suited to those environments, yet by the use of a simple infrared direct transmission mechanism, non-networked remote devices, such as vending machines, kiosks, and gasoline pumps, can very inexpensively be retrofitted to beam receipts to pervasive devices such as PDA's which need no IP connectivity. By virtue of the art here, the user has definitive proof of the transaction in a timely manner.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper cards, floppy disc, hard disk drive, RAM, and CD-ROMs and transmission-types of media, such as digital and analog communications links.

We claim:

1. A method for completing a transaction between a Point of Sale (POS) device of a vendor or service provider (vendor/service provider) and a portable electronic device (PED) possessed by a consumer, said method comprising:

said POS device receiving payment for the transaction, said transaction comprising a purchase of goods or services by the consumer, wherein the PED is located in close proximity to and separated from the POS device;

after said receiving payment, said POS device directing the consumer to select a receipt option selected from the group consisting of receiving an electronic receipt for the transaction, receiving a paper receipt for the transaction, and not receiving a receipt for the transaction;

after said directing the consumer, said POS device receiving notification that the consumer has selected the receipt option of receiving an electronic receipt for the transaction;

responsive to said receiving notification, said POS device scanning for a radio frequency signal or an infrared signal emitted from the PED in a vicinity of the POS device;

said POS device detecting the emitted signal;

responsive to said detecting, said POS device establishing a connection with the PED;

after said establishing the connection, said POS device performing activities that comprise transmitting vendor/service provider data pertaining to the transaction to the PED; receiving consumer data from the PED, and receiving a PED authentication key from the PED;

after said performing activities, said POS device assembling the electronic receipt consisting of a receipt data packet, wherein said assembling includes encrypting the consumer data using the received PED authentication key, encrypting the vendor/service provider data using a vendor/service provider authentication key provided by the vendor or service provider, and inserting the encrypted consumer data and the encrypted vendor/service provider data into a consumer data portion and a vendor/service provider data portion, respectively, of the receipt data packet;

said POS device transmitting the assembled receipt data packet to the PED.

2. The method of claim 1, wherein the method further comprises inserting common data in a common data portion of the receipt data packet;

wherein the common data consists of first common data and second common data;

wherein the consumer data portion consists of the first common data and consumer information of interest to the consumer; and wherein the vendor/service provider data portion consists of the first common data and vendor/service provider information of interest to the vendor or service provider.

3. The method of claim 2, wherein the first common data in the common data portion consists of the date and time of the transaction, a transaction amount of the transaction, a location of the transaction, and a credit card type of a credit card used for the payment; and wherein the second common data in the common data portion consists of an identifier of the consumer, an identifier of the vendor or service provider, and a portion of a full credit card number of the credit card.

4. The method of claim 3, wherein the consumer information consists of the identifier of the vendor or service provider and the full credit card number of the credit card; and wherein the vendor/service provider information consists of the identifier of the consumer, an identifier of the transaction, an identifier of a franchise of the vendor or service provider, an identifier of the POS device or the PED, the full credit card number of the credit card, and an authorization code of the transaction.

5. The method of claim 2, wherein the method further comprises distributing digital bits of a digital validation key in a validation key portion of the receipt data packet, said digital validation key consisting of the digital bits;

wherein the receipt data packet consists of the common data portion, the consumer data portion, the vendor/service provider data portion, and the validation key portion; and wherein the digital validation key is configured to be used in detection of whether any data in the receipt data packet has changed.

6. The method of claim 5,
wherein the digital validation key comprises a common validation key, a consumer validation key, and a vendor/service provider validation key;
wherein the common validation key is configured to be used in detection of whether any data in the common data portion of the receipt data packet has changed;
wherein the consumer validation key is configured to be used in detection of whether any data in the consumer data portion has of the receipt data packet has changed; and
wherein the vendor/service provider validation key is configured to be used in detection of whether any data in the vendor/service provider data portion has of the receipt data packet has changed.

7. The method of claim 1, wherein the method further comprises said POS device transmitting the assembled receipt data packet to a consumer permanent storage of possessed by the PED, and wherein the PED and the consumer permanent storage are separated from each other by a global computing network.

8. The method of claim 1, wherein receiving notification consists of determining that a physical button on the POS device has been depressed.

9. A system comprising a Point of Sale (POS) device of a vendor or service provider (vendor/service provider), said POS device comprising a processor and a computer readable storage medium storing instructions that upon being executed by the processor perform a method for completing a transaction between the POS device and a portable electronic device (PED) possessed by a consumer, said method comprising:
said POS device receiving payment for the transaction, said transaction comprising a purchase of goods or services by the consumer, wherein the PED is located in close proximity to and separated from the POS device;
after said receiving payment, said POS device directing the consumer to select a receipt option selected from the group consisting of receiving an electronic receipt for the transaction, receiving a paper receipt for the transaction, and not receiving a receipt for the transaction;
after said directing the consumer, said POS device receiving notification that the consumer has selected the receipt option of receiving an electronic receipt for the transaction;
responsive to said receiving notification, said POS device scanning for a radio frequency signal or an infrared signal emitted from the PED in a vicinity of the POS device;
said POS device detecting the emitted signal;
responsive to said detecting, said POS device establishing a connection with the PED;
after said establishing the connection, said POS device performing activities that comprise transmitting vendor/service provider data pertaining to the transaction to the PED; receiving consumer data from the PED, and receiving a PED authentication key from the PED;
after said performing activities, said POS device assembling the electronic receipt consisting of a receipt data packet, wherein said assembling includes encrypting the consumer data using the received PED authentication key, encrypting the vendor/service provider data using a vendor/service provider authentication key provided by the vendor or service provider, and inserting the encrypted consumer data and the encrypted vendor/service provider data into a consumer data portion and a vendor/service provider data portion, respectively, of the receipt data packet;
said POS device transmitting the assembled receipt data packet to the PED.

10. The system of claim 9,
wherein the method further comprises inserting common data in a common data portion of the receipt data packet;
wherein the common data consists of first common data and second common data;
wherein the consumer data portion consists of the first common data and consumer information of interest to the consumer; and
wherein the vendor/service provider data portion consists of the first common data and vendor/service provider information of interest to the vendor or service provider.

11. The system of claim 10,
wherein the first common data in the common data portion consists of the date and time of the transaction, a transaction amount of the transaction, a location of the transaction, and a credit card type of a credit card used for the payment; and
wherein the second common data in the common data portion consists of an identifier of the consumer, an identifier of the vendor or service provider, and a portion of a full credit card number of the credit card.

12. The system of claim 11,
wherein the consumer information consists of the identifier of the vendor or service provider and the full credit card number of the credit card; and
wherein the vendor/service provider information consists of the identifier of the consumer, an identifier of the transaction, an identifier of a franchise of the vendor or service provider, an identifier of the POS device or the PED, the full credit card number of the credit card, and an authorization code of the transaction.

13. The system of claim 10,
wherein the method further comprises distributing digital bits of a digital validation key in a validation key portion of the receipt data packet, said digital validation key consisting of the digital bits;
wherein the receipt data packet consists of the common data portion, the consumer data portion, the vendor/service provider data portion, and the validation key portion; and
wherein the digital validation key is configured to be used in detection of whether any data in the receipt data packet has changed.

14. The system of claim 13,
wherein the digital validation key comprises a common validation key, a consumer validation key, and a vendor/service provider validation key;
wherein the common validation key is configured to be used in detection of whether any data in the common data portion of the receipt data packet has changed;
wherein the consumer validation key is configured to be used in detection of whether any data in the consumer data portion has of the receipt data packet has changed; and
wherein the vendor/service provider validation key is configured to be used in detection of whether any data in the vendor/service provider data portion has of the receipt data packet has changed.

15. A computer program product comprising a computer readable storage medium storing instructions that upon being executed by a processor perform a method for completing a transaction between a Point of Sale (POS) device of a vendor or service provider (vendor/service provider) and a portable electronic device (PED) possessed by a consumer, said POS device comprising the processor, said method comprising:

said POS device receiving payment for the transaction, said transaction comprising a purchase of goods or services by the consumer, wherein the PED is located in close proximity to and separated from the POS device;

after said receiving payment, said POS device directing the consumer to select a receipt option selected from the group consisting of receiving an electronic receipt for the transaction, receiving a paper receipt for the transaction, and not receiving a receipt for the transaction;

after said directing the consumer, said POS device receiving notification that the consumer has selected the receipt option of receiving an electronic receipt for the transaction;

responsive to said receiving notification, said POS device scanning for a radio frequency signal or an infrared signal emitted from the PED in a vicinity of the POS device;

said POS device detecting the emitted signal;

responsive to said detecting, said POS device establishing a connection with the PED;

after said establishing the connection, said POS device performing activities that comprise transmitting vendor/service provider data pertaining to the transaction to the PED; receiving consumer data from the PED, and receiving a PED authentication key from the PED;

after said performing activities, said POS device assembling the electronic receipt consisting of a receipt data packet, wherein said assembling includes encrypting the consumer data using the received PED authentication key, encrypting the vendor/service provider data using a vendor/service provider authentication key provided by the vendor or service provider, and inserting the encrypted consumer data and the encrypted vendor/service provider data into a consumer data portion and a vendor/service provider data portion, respectively, of the receipt data packet;

said POS device transmitting the assembled receipt data packet to the PED.

16. The computer program product of claim 15, wherein the method further comprises inserting common data in a common data portion of the receipt data packet;

wherein the common data consists of first common data and second common data;

wherein the consumer data portion consists of the first common data and consumer information of interest to the consumer; and wherein the vendor/service provider data portion consists of the first common data and vendor/service provider information of interest to the vendor or service provider.

17. The computer program product of claim 16, wherein the first common data in the common data portion consists of the date and time of the transaction, a transaction amount of the transaction, a location of the transaction, and a credit card type of a credit card used for the payment; and wherein the second common data in the common data portion consists of an identifier of the consumer, an identifier of the vendor or service provider, and a portion of a full credit card number of the credit card.

18. The computer program product of claim 17, wherein the consumer information consists of the identifier of the vendor or service provider and the full credit card number of the credit card; and wherein the vendor/service provider information consists of the identifier of the consumer, an identifier of the transaction, an identifier of a franchise of the vendor or service provider, an identifier of the POS device or the PED, the full credit card number of the credit card, and an authorization code of the transaction.

19. The computer program product of claim 16, wherein the method further comprises distributing digital bits of a digital validation key in a validation key portion of the receipt data packet, said digital validation key consisting of the digital bits;

wherein the receipt data packet consists of the common data portion, the consumer data portion, the vendor/service provider data portion, and the validation key portion; and wherein the digital validation key is configured to be used in detection of whether any data in the receipt data packet has changed.

20. The computer program product of claim 19, wherein the digital validation key comprises a common validation key, a consumer validation key, and a vendor/service provider validation key;

wherein the common validation key is configured to be used in detection of whether any data in the common data portion of the receipt data packet has changed;

wherein the consumer validation key is configured to be used in detection of whether any data in the consumer data portion has of the receipt data packet has changed; and wherein the vendor/service provider validation key is configured to be used in detection of whether any data in the vendor/service provider data portion has of the receipt data packet has changed.

* * * * *